(12) United States Patent
Dorsey et al.

(10) Patent No.: US 11,709,748 B2
(45) Date of Patent: Jul. 25, 2023

(54) ADAPTIVE MEMORY PERFORMANCE CONTROL BY THREAD GROUP

(71) Applicant: Apple Inc., Cupertino, CA (US)

(72) Inventors: John G. Dorsey, San Francisco, CA (US); Andrei Dorofeev, San Jose, CA (US); Keith Cox, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 202 days.

(21) Appl. No.: 17/098,262

(22) Filed: Nov. 13, 2020

(65) Prior Publication Data
US 2021/0157700 A1 May 27, 2021

Related U.S. Application Data

(60) Provisional application No. 62/938,828, filed on Nov. 21, 2019.

(51) Int. Cl.
*G06F 11/30* (2006.01)
*G06F 11/07* (2006.01)
*G06F 11/34* (2006.01)
*G06F 9/50* (2006.01)

(52) U.S. Cl.
CPC ........ *G06F 11/3024* (2013.01); *G06F 9/5094* (2013.01); *G06F 11/076* (2013.01); *G06F 11/3058* (2013.01); *G06F 11/3409* (2013.01)

(58) Field of Classification Search
CPC ............. G06F 11/3024; G06F 11/3037; G06F 11/3058; G06F 11/3409; G06F 11/076
See application file for complete search history.

(56) References Cited

U.S. PATENT DOCUMENTS

| 10,884,811 | B2 | 1/2021 | Andrus et al. | |
|---|---|---|---|---|
| 2015/0019891 | A1* | 1/2015 | Kumar | G06F 1/3296 |
| | | | | 713/322 |
| 2016/0246647 | A1* | 8/2016 | Harris | G06F 9/5027 |
| 2017/0212581 | A1* | 7/2017 | Park | G06F 12/0802 |
| 2018/0349191 | A1* | 12/2018 | Dorsey | G06F 9/4856 |
| 2019/0179757 | A1* | 6/2019 | Walker | G06F 12/0862 |

* cited by examiner

*Primary Examiner* — Manuel L Barbee
(74) *Attorney, Agent, or Firm* — BakerHostetler (57) ABSTRACT

A device implementing adaptive memory performance control by thread group may include a memory and at least one processor. The at least one processor may be configured to execute a group of threads on one or more cores. The at least one processor may be configured to monitor a plurality of metrics corresponding to the group of threads executing on one or more cores. The metrics may include, for example, a core stall ratio and/or a power metric. The at least one processor may be configured to determine, based at least in part on the plurality of metrics, a memory bandwidth constraint with respect to the group of threads executing on the one or more cores. The at least one processor may be configured to, in response to determining the memory bandwidth constraint, increase a memory performance corresponding to the group of threads executing on the one or more cores.

20 Claims, 6 Drawing Sheets

ADAPTIVE MEMORY PERFORMANCE CONTROL BY THREAD GROUP

CROSS REFERENCE TO RELATED APPLICATIONS

This application claims the benefit of priority to U.S. Provisional Patent Application No. 62/938,828, entitled "Adaptive Memory Performance Control by Thread Group," filed on Nov. 21, 2019, the disclosure of each of which is hereby incorporated herein in its entirety for all purposes.

TECHNICAL FIELD

The present description relates generally to adaptive memory performance control, including adaptive memory performance control by thread group.

BACKGROUND

A multi-core processor is a single computing component with two or more independent processing units called "cores." Cores are units that read and execute program instructions. The multi-core processor can run multiple instructions on separate cores at the same time, increasing overall speed for programs amenable to parallel computing. The multiple cores may be incorporated onto a single integrated circuit. Types of multicore processors may include, for example, symmetric multicore processors (SMP) and asymmetric multicore processors (AMP). A symmetric multiprocessor may include two or more identical processors controlled by a single operating system instance that treats all processors equally, reserving none for special purposes. Symmetric multicore processors may have multiple cores of a same core type. Asymmetric multicore processors may have multiple cores which may be of a different architecture from one another. Each core may or may not run an operating system.

An AMP can have a first set of cores that is more efficient than a second set of cores. The second set of cores can be designed for performance (e.g., P-cores), while the first set of cores may be designed for efficiency (e.g., E-cores). In this regard, efficiency may be concerned with minimum energy consumed per instruction processed while performance may be concerned with maximum number of instructions processed per unit of time.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

In an asymmetric multicore processor, a memory bandwidth constraint, such as a constraint with respect to the fabric that interconnects the cores and/or a constraint with respect to dynamic random access memory (DRAM) utilized by the cores, may result in one or more of the performance cores (e.g., P-core) experiencing a significant number of stalls (e.g., cache misses). The stalls may be remedied by reducing the performance, e.g., reducing the frequency, of the P-cores. However, when a P-core is utilizing a substantial amount of energy, it be undesirable to reduce the performance of the P-core.

In the subject system, when a P-core is experiencing a significant number of stalls with respect to a particular group of threads (e.g., a thread group), and the P-core is utilizing a substantial amount of energy (e.g., based on monitored power draw and/or monitored energy per instruction for the thread group), the system adaptively increases the performance of the memory hierarchy, instead of decreasing the performance of the P-core. Increasing the performance of the memory hierarchy may include, for example, increasing the frequency and/or voltage level with respect to the DRAM and/or the fabric, which may result in a small increase in energy consumption relative to the energy being consumed by the P-core. In this manner, the subject system is able to reduce the number of stalls while maintaining the performance of the P-core.

Furthermore, the subject system monitors the number of stalls, the energy consumption, and several additional metrics on a per-thread group basis. In this manner, the monitored metrics can follow the thread group from P-core to P-core, e.g., when one or more threads of the thread group are moved to a different P-core, which allows the subject system to adaptively respond to memory bandwidth constraints across cores of a multicore processor.

Figure 1:
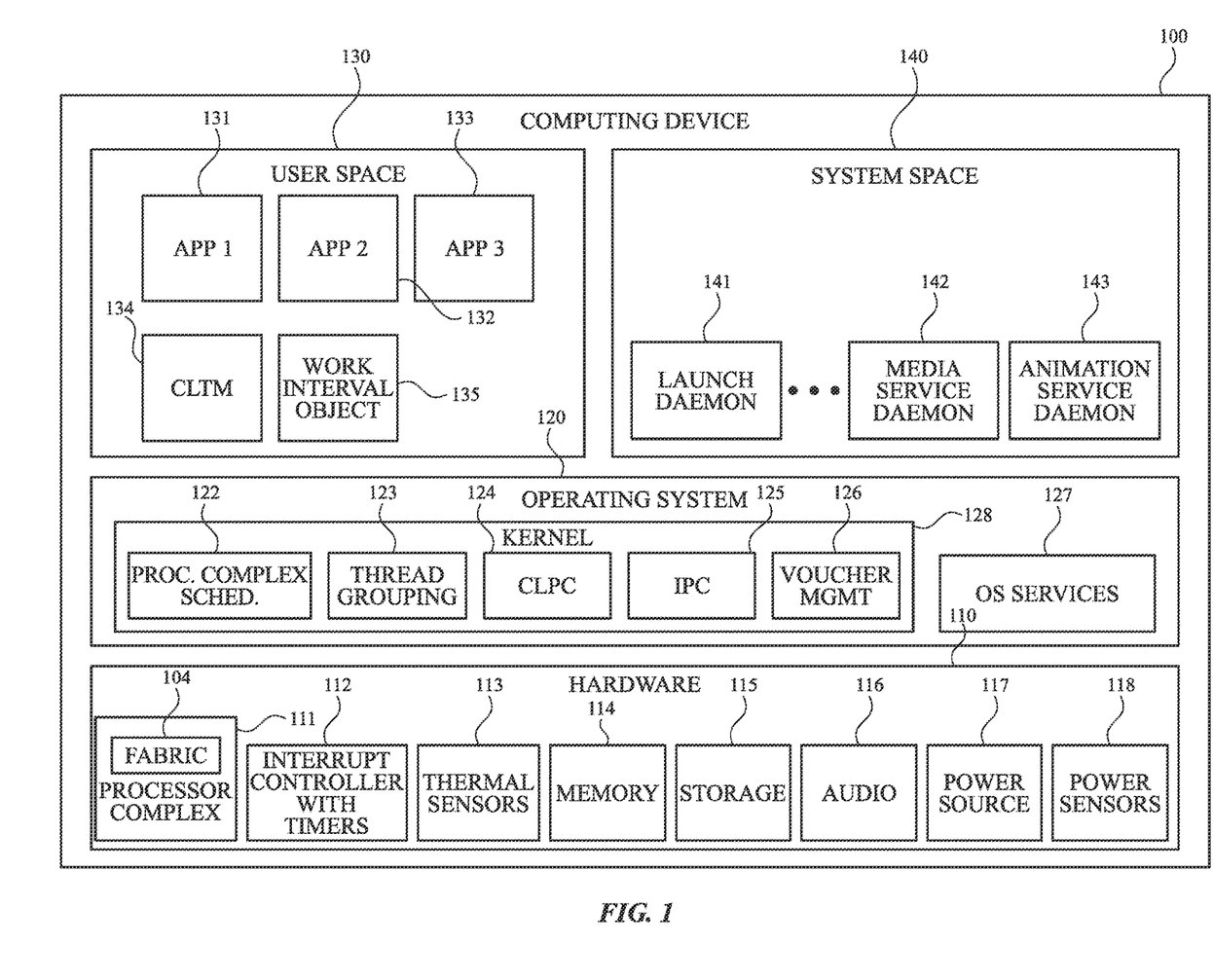
FIG. 1 illustrates an overview of a computing device for processing threads having thread groups on a processor that includes different core types in accordance with one or more implementations.

FIG. 1 illustrates an overview of a computing device 100 for processing threads having thread groups on a processor that includes different core types in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The computing device 100 can include hardware 110, an operating system 120, a user space 130, and a system space 140. The hardware 110 can include a processor complex 111 with different core types or multiple processors of differing types. The processor complex 111 may include a multiprocessing system having multiple clusters of cores, each cluster having one or more cores of a core type, interconnected with one or more buses and/or a memory fabric interconnect 104.

The memory fabric interconnect 104, which may also be referred to as memory fabric 104 or fabric 104, communicatively couples, e.g., interconnects, the different cores and/or processors of the processor complex 111. In one or more implementations, the fabric 104 may be dynamically tunable. For example, the fabric 104 may operate at adjustable frequencies and/or voltage levels. In one or more implementations, different frequencies and/or voltage levels of the memory fabric interconnect may be mapped to different performance states for the fabric 104, such as different dynamic voltage and frequency scaling (DVFS) states. The different performance states of the fabric 104 may be adaptively set and/or adjusted to control the performance of the fabric 104, as is discussed further below with respect to FIGS. 3 and 4.

The processor complex 111 may include a symmetric multiprocessing system (SMP) having clusters of a same core type where at least one cluster of cores is configured differently from at least one other cluster of cores. Cluster configurations can include, e.g., different configurations of DVFS states, different cache hierarchies, or differing amounts or speeds of cache. The processor complex 111 may also include an asymmetric multiprocessing system (AMP) having clusters of cores where at least one cluster of cores has a different core type than at least one other cluster of cores. Each cluster can have one or more cores. Core types can include performance core (e.g., P-cores), efficiency cores (e.g., E-cores), graphics cores, digital signal processing cores, arithmetic processing cores, neural engine cores, or generally any type of processing cores.

A performance core may have an architecture that is designed for very high throughput and may include specialized processing such as pipelined architecture, floating point arithmetic functionality, graphics processing, or digital signal processing. A performance core may consume more energy per instruction than an efficiency core, and/or may have a higher peak performance than an efficiency core. In one or more implementations, the processor complex 111 may be and/or may include a system on a chip (SoC) that may include one or more of the hardware elements in the hardware 110.

The hardware 110 can further include an interrupt controller 112 having interrupt timers for each core type of processor complex 111. The interrupt controller 112 can be used, with interrupt timers, to implement deferred inter-processor interrupts (DIPI). The hardware 110 may also include one or more thermal sensors 113. In one or more implementations, when the processor complex 111 is and/or includes an SoC, one more thermal sensors 113 can be included in the SoC. For example, at least one thermal sensor 113 may be included on the SoC for each core type of the processor complex 111.

The hardware 110 may also include memory 114, storage 115, audio 116, one or more power sources 117, and one or more energy and/or power sensors 118. The memory 114 may be any type of memory including dynamic random-access memory (DRAM), static RAM, read-only memory (ROM), flash memory, or other memory device. In one or more implementations, the memory 114 may be dynamically tunable. For example, the memory 114 may operate at adjustable frequencies and/or voltages. In one or more implementations, different frequencies and/or voltages of the memory 114 may be mapped to different performance states for the memory 114, such as different DVFS states. The different performance states of the memory 114 may be adaptively set and/or adjusted to control the performance of the memory 114, as is discussed further below with respect to FIGS. 3 and 4.

The storage 115 may include hard drive(s), solid state disk(s), flash memory, USB drive(s), network attached storage, cloud storage, or other storage medium. The audio 116 may include an audio processor that may include a digital signal processor, memory, one or more analog to digital converters (ADCs), digital to analog converters (DACs), digital sampling hardware and software, one or more coder-decoder (codec) modules, and other components. The hardware 110 may also include video processing hardware and software (not shown), such as one or more video encoders, camera, display, and the like.

The power source 117 may include one or more storage cells or batteries, an AC/DC power converter, or other power supply. The power source 117 may also include one or more energy or power sensors 118. The power sensors 118 may also be included in specific locations, such as power consumed by the processor complex 111, power consumed by a particular subsystem, such as a display, storage device, network interfaces, and/or radio and cellular transceivers, and the like. The computing device 100 may include one or more of the above components, and/or may include one or more components as described below with reference to FIG. 6.

The operating system 120 may include a kernel 128 and one or more other operating system services 127. The kernel 128 may include a processor complex scheduler 122 for the processor complex 111. The processor complex scheduler 122 may include interfaces to the processor complex 111 and/or the interrupt controller 112. The kernel 128, or the processor complex scheduler 122, may include thread grouping logic 123 that enables the closed loop performance controller (CLPC) 124 to measure, track, and control performance of threads by thread groups. The CLPC 124 may include logic to receive sample metrics from processor complex scheduler 122, process the sample metrics per thread group, and determine a control effort needed to meet performance targets for the threads in the thread group.

The CLPC 124 may recommend core types and/or dynamic voltage and frequency scaling (DVFS) state for one or more cores processing threads of the thread group and/or the CLPC 124 may recommend a memory performance state and/or constraint with respect to the fabric 104 and/or the memory 114. The inter-process communication (IPC) module 125 may facilitate communication between the kernel 128, the processes of the user space 130, and/or the processes of the system space 140.

In one or more implementations, the IPC module 125 may receive a message from a thread that references a voucher. A voucher may be a collection of attributes in a message sent via inter-process communication (IPC) from a first thread, T1, to a second thread, T2. One of the attributes that the first thread T1 may include in the voucher is the thread group to which T1 currently belongs. The voucher may include a reference to a thread group that the second thread T2 is to adopt before performing work on behalf of the first thread T1. The voucher management module 126 may manage vouchers within the operating system 120, the user space 130, and/or the system space 140.

The operating system services 127 may include input/output (I/O) service for such devices as the memory 114, the storage 115, network interface(s) (not shown), a display (not shown), and/or other I/O device(s). The OS services 127 may further include audio and video processing interfaces, data/time service, and/or other OS services.

The user space 130 may include one or more application programs 131-133, closed loop thermal manager (CLTM) 134, and/or one or more work interval object(s) 135. The CLTM 134 may monitor power consumption and/or temperature metrics and may feed samples of the metrics into tunable controllers. The output of the CLTM 134 may determine a processor complex average power target used as input to a control effort limiter (CEL) to determine a limit on a control effort that is output by the CLPC 124. The control effort limit can be used to limit the type of cores, number of cores of each type, and/or DVFS state for the cores for the processor complex 111. In one or more implementations, the output of the CLTM 134 may further be used to limit or constrain the performance states of the fabric 104 and/or the memory 114. The CLTM 134 is described further below with reference to FIG. 2.

A work interval object 135 is used to represent periodic work where each period has a deadline. The work interval object 135 possesses a token and a specified time interval for one instance of the work. Threads that perform work of a particular type, e.g. audio compositing, and for which the work must be completed in a specified interval of time, e.g. a frame rate of audio, may be associated with the work interval object 135. The user space 130 may include multiple work interval objects 135. In one or more implementations, a work interval object 135 may have its own thread group, as may be specified in source code, compiled code, or a bundle of executables for execution. One or more threads that perform work on behalf of the work interval object 135 may opt-in to the thread group of the work interval object 135. For threads that have opted-in and adopted the thread group of the work interval object 135, work performed by the threads, on behalf of the work interval object 135, may be associated with the thread group of the work interval object 135 for purposes of the operation of the CLPC 124. Example work interval objects are discussed further below with respect to FIG. 5.

The system space 140 may include a launch daemon 141 and/or one or more other daemons, e.g. a media service daemon 142 and/or an animation daemon 143. In one or more implementations, threads that are launched by a daemon that perform a particular type of work, e.g. the daemons 142 and/or 143, may adopt the thread group of the daemon. Execution metrics of a thread that adopted the thread group of the daemon that launched the thread are attributable to the thread group of the daemon for purposes of the operation of the CLPC 124.

In one or more implementations, one or more of the processor complex 111, the interrupt controller 112, the thermal sensors 113, the memory 114, the storage 115, the audio 116, the power source 117 and/or the power sensors 118, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 2:
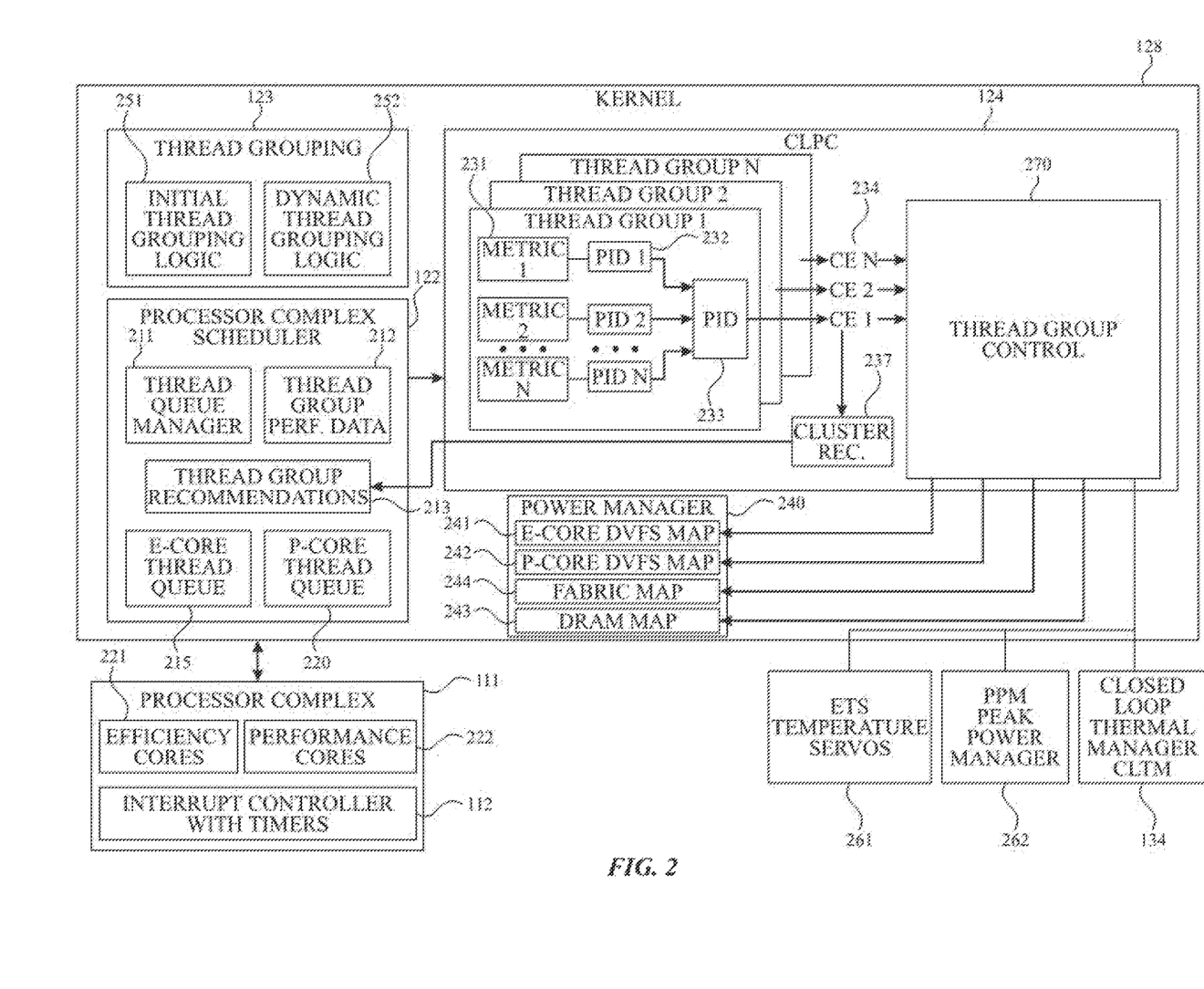
FIG. 2 illustrates a detailed view of a system for processing threads having thread groups on a processor that includes different core types in accordance with one or more implementations.

FIG. 2 illustrates a detailed view of a system for processing threads having thread groups on a processor that includes different core types in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As discussed above, a thread group may include one or more threads that are grouped together based on one or more characteristics that are used to determine a common goal or purpose of the threads in the thread group. FIG. 2 describes, at a high level, the interaction between subsystems described above, with reference to FIG. 1.

The processor complex scheduler 122 may include a thread queue manager 211, a thread group performance data manager 212, a thread group recommendation manager 213, and one or more thread queues for each processor core type. In an example processor complex 111, the processor complex scheduler 210 may include an E-core thread queue 215 and a P-core thread queue 220.

The thread queue manager 211 may manage the scheduling of threads for each of the cores types of the processor complex 111, e.g., the E-core thread queue 215 and the P-core thread queue 220. The thread queue manager 211 can further include logic to program the interrupt controller 112 for immediate and/or deferred interrupts.

The thread group performance data manager 212 of the processor complex scheduler 122 may collect thread execution metrics for each thread group executing on the processor complex 111. The thread execution metrics 231 can be sampled from the collected thread execution metrics of thread group performance data manager 212 and provided to tunable controllers 232 of the CLPC 124 for each thread group. In one or more implementations, one or more of the tunable controllers 232 may be a proportional-integral-derivate (PID) controller.

The thread group recommendation manager 213 may receive core type (cluster) recommendations from cluster recommendations 237 for each thread group that has been active on the processor complex 111. The thread queue manager 211 may utilize the cluster recommendations 237 for each thread group to program threads of each thread group onto an appropriate core type queue, e.g. 215 or 220.

The CLPC 124 is a closed loop performance controller that determines, for each thread group active on a core, a control effort needed to ensure that threads of the thread group meet their performance goals. A performance goal can include ensuring a minimum scheduling latency, ensuring a block I/O completion rate, ensuring an instruction completion rate, maximizing processor complex utilization (minimizing core idles and restarts), and ensuring that threads associated with work interval objects complete their work in a predetermined period of time associated with the work interval object.

Metrics can be periodically computed by the CLPC 124 from inputs sampled by the CLPC 124 either periodically or through asynchronous events from other parts of the system. In an embodiment, inputs can be sampled at an asynchronous event, such as the completion of a work interval object time period, or a storage event. The thread execution metrics 231 can be computed within the CLPC 124 and each fed to a tunable controller 232. The tunable controllers 232 generate an output to a tunable thread group PID 233, which in turn outputs a control effort 234 needed for the thread group to meet its performance goals.

In one or more implementations, a control effort 234 is a unitless value in the range 0 . . . 1 that can be mapped to a performance map and used to determine a recommended core cluster type for the thread group. The cluster recommendations 237 are returned to the thread group recommendation manager 213 in the processor complex scheduler 122 for scheduling threads to one or more core types. For each of thread groups 1 . . . n, a control effort CE 1 . . . n 234 is passed to the thread group control module 270. The thread group control module 270 determines, for each thread group, dynamic voltage and frequency scaling (DVFS) state for S-cores and P-cores, as well as performance states, e.g. DVFS states, for the fabric 104 and/or the memory 114, as is discussed further below with respect to FIG. 3. In one or more implementations, the CLPC 124 may receive input from temperature control loops 261, a peak power manager 262, and/or a closed loop thermal manager (CLTM) 134, which may be used, in one or more implementations, to limit the control effort 234.

The power manager 240 may receive, from the thread group control module 270, a DVFS state for each core type utilized by a given thread group. The power manager 240 may set the DVFS state, and number of active cores in an E-core DVFS map 241 and P-core DVFS map 242 for the thread group. In one or more implementations, the power manager 240 may receive a DVFS constraint for a given core type from the thread group control module 270. The DVFS constraint may constrain a minimum and/or maximum performance of a given core type for a thread group.

The power manager 240 may further receive, from the thread group control module 270, a memory performance state, such as a DVFS state, for the memory 114 and/or the fabric 104 for an active thread group. The power manager 240 may set the DVFS state for the memory 114 in the DRAM map 243 and the DVFS state for the fabric 104 in the fabric map 244.

Figure 3:
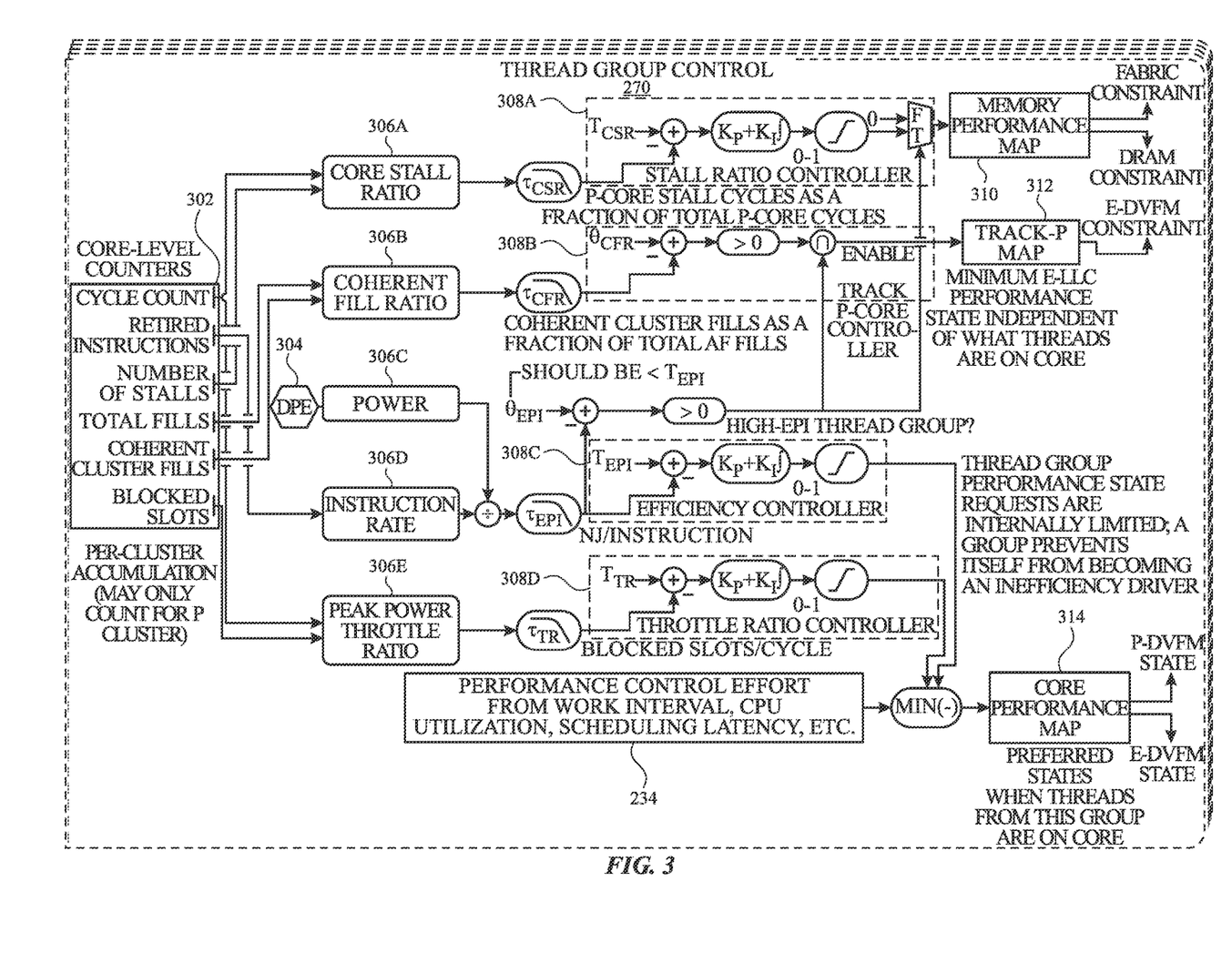
FIG. 3 illustrates components of a thread group control module in accordance with one or more implementations.

FIG. 3 illustrates components of a thread group control module 270 in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The thread group control module 270 includes core-level counters 302, a digital power estimator 304, metrics 306A-E, controllers 308A-D, a memory performance map 310, a track P-core map 312, and a core performance map 314. The thread group control module 270 receives a control effort 234 for a given thread group as an input from the CLPC 124. In one or more implementations, one or more of the controllers 308A-D may be a proportional-integral-derivate (PID) controller.

The core-level counters 302 may be hardware counters that count, per P-core (and/or P cluster), cycle count, retired instructions, number of stalls, total fills, coherent cluster fills, and blocked slots. From the core-level counters 302, the thread group control module 270 may monitor/maintain the metrics 306A-E per thread group, and across cores. The metrics 306A-E may include a core stall ratio 306A which may indicate the P-core stall cycles (e.g., cache misses) as a fraction of total stall cycles, a core power metric 306C, e.g. a core power metric, which may reflect the amount of power being drawn by the P-core, an instruction rate metric 306D which may reflect the number of instructions being retired by the P-core, and a peak power throttle ratio 306E which may indicate the number of slots per cycle that are being blocked due to power constraints.

In one or more implementations, one or more threads of a thread group may be executing on a P-core for which the metrics 306A-E are being monitored, as well as at least one E-core. The coherent fill ratio 306B indicates the number of fills (e.g., cache line fills) attributed to the E-core that is executing one or more threads of the thread group as a fraction of total fills.

The thread group control module 270 may monitor and maintain the metrics 306A-E for each thread group across all of the cores in the processor complex 111. For example, if one or more threads of the thread group are executing on a first P-core and are then moved to a second P-core, the thread group control module 270 maintains the values of the metrics 306A-E for the thread group from the first P-core to the second P-core. In this manner, the thread group control module 270 can maintain a performance history with respect to each thread group, and can rapidly adapt to memory bandwidth constraints across P-cores for a given thread group.

The stall ratio controller 308A attempts to limit the core stall ratio 306A to a particular target value $T_{csr}$. When the core stall ratio 306A exceeds the target value, the stall ratio controller 308A determines whether a power metric for the P-core exceeds a particular threshold. The power metric may be, for example, an energy per instruction (EPI) metric, and/or may be the amount of power being drawn by the P-core, e.g. as reflected in the core power metric 306C.

When the power metric exceeds the threshold and the core stall ratio 306A exceeds the target value, a memory constraint, or a memory bandwidth constraint, may be impacting the performance of the computing device 100. Since the P-core is operating at a high power level, in this instance it may be desirable to increase the performance of the memory hierarchy, e.g., the memory 114 and/or the fabric 104, instead of decreasing the performance of the P-core.

Thus, when the power metric exceeds the threshold, the stall ratio controller 308A outputs a control effort value that indexes into the memory performance map 310. The memory performance map 310 may use the index to map from one or more performance states to one or more DVFS states for the memory 114 and/or the fabric 104. The memory performance map 310 may output a fabric constraint and/or a DRAM constraint to the power manager 240. The constraints may be, for example, a minimum DVFS state, a minimum frequency, and/or a minimum voltage for the memory 114 and/or the fabric 104. The power manager 240 may receive the constraints from the thread group control module 270 and may set the DVFS for the fabric 104 in the fabric map 244 and/or for the memory 114 in the DRAM map 243.

The track P-core controller 308B determines when the coherent fill ratio 306B exceeds a particular threshold value. When the track P-core controller 308B determines that the coherent fill ratio 306B exceeds the threshold value, the track P-core controller 308B may output a signal to the track P-core map 312 to increase the performance of the E-core on which one or more threads of the thread group are executing. The track P-core map 312 may determine a DVFS constraint, e.g., a minimum DVFS, for the E-core and may transmit the constraint to the power manager 240. The power manager 240 may set the E-core DVFS map 241 accordingly.

In order to allow the computing device 100 to satisfy battery life goals, the efficiency controller 308C may determine when the energy dissipated per retired instruction exceeds an efficiency threshold (and/or target), e.g., $T_{epi}$. $T_{epi}$ is the control target for a loop (e.g., proportional-integral control) closed around a measure of efficiency expressed in nanojoules (nJ) per instruction. The efficiency metric may be calculated by first determining the number of instructions retired during a sample interval for the thread group (as reported by the core-level counters 302) and dividing this number by the amount of energy dissipated by the P-core for the thread group (e.g., using a measurement or estimate of power provided by the DPE 304) over that interval. The output of the efficiency controller 308C is a limit control effort that indexes into the core performance map 314.

To prevent voltage droops in the processor complex power delivery network (i.e., between the processor complex voltage regulator and the processor complex 111), an automatic hardware throttle mechanism blocks instruction or micro-operations issued (i.e., from reservation stations into execution pipelines) when measured or estimated processor complex current exceeds a limit. This peak power throttle reduces the rate at which the processor complex 111 executes work, but it does not reduce processor complex frequency or voltage. As a result, it can be inefficient to complete a significant amount of work with the throttle engaged; efficiency is improved by lowering the processor complex core type DVFS state.

The throttle ratio controller 308D limits the throttle assertion to a throttle rate target, $T_{tr}$. This is the control target for a loop (e.g., proportional-integral control) closed around a measure of throttle assertions expressed in blocked issue slots per processor complex cycle for the thread group. The throttle rate metric is calculated by first determining the number of issue slots that were blocked during a sample interval (as reported by the core-level counters 302) and dividing this number by the number of cycles clocked by the P-core (again, as reported by the core-level counters 302) over that interval. The output of the closed-loop controller is a limit control effort that indexes into the core performance map 314.

The minimum of the limit control effort output by the efficiency controller 308C and the limit control effort output by the throttle ratio controller 308D is output to the core performance map 314. The core performance map 314 maps the minimum of the limit control efforts to a particular P-core DVFS state and an E-core DVFS state, and the core performance map 314 provides the DVFS states to the power manager 240. The power manager 240 may set the E-core DVFS map 241 and the P-core DVFS map 242 accordingly.

Figure 4:
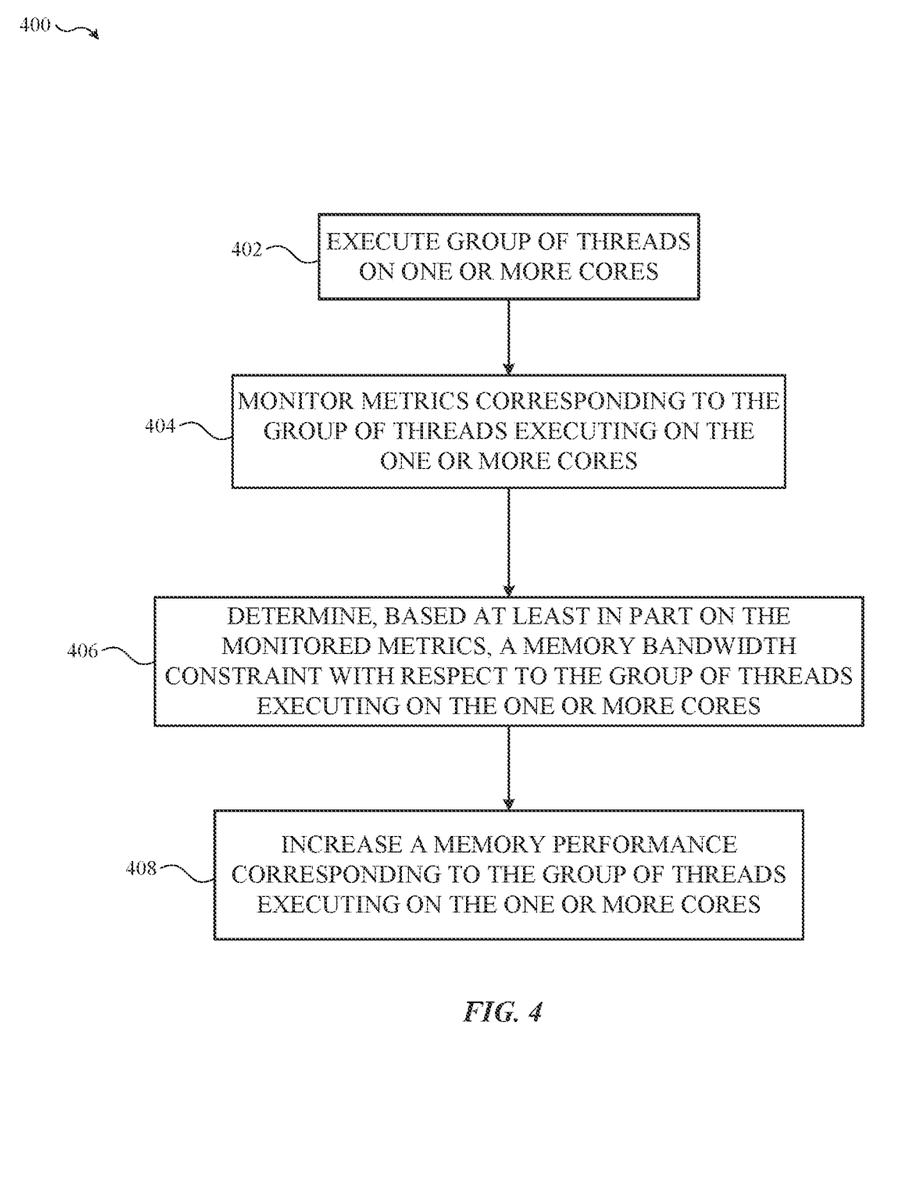
FIG. 4 illustrates a flow diagram of an example process for adaptive memory performance control by thread group in accordance with one or more implementations.

FIG. 4 illustrates a flow diagram of an example process 400 for adaptive memory performance control by thread group in accordance with one or more implementations. For explanatory purposes, the process 400 is primarily described herein with reference to the computing device 100 of FIGS. 1-2. However, the computing device 100 is presented as an exemplary device and the operations described herein may be performed by any suitable device. Further, for explanatory purposes, the operations of the process 400 are described herein as occurring in serial, or linearly. However, multiple operations of the process 400 may occur in parallel, such that they at least partially overlap in time. In addition, the operations of the process 400 need not be performed in the order shown and/or one or more of the operations of the process 400 need not be performed and/or can be replaced by other operations.

The process 400 begins when a group of threads, e.g. a thread group, is executing on one or more cores of a computing device 100 (402). For example, a thread group may be executing on one or more P-cores and one or more E-cores. A thread group control module 270 of the computing device 100 may monitor one or more metrics corresponding to the group of threads executing on the one or more cores (404). The metrics may correspond to one of the P-cores executing one or more threads of the thread group, and the metrics may include, for example, a core power metric, an energy per instruction metric, and/or a core stall ratio. The core power metric may indicate an amount of power being drawn by the one of the P-cores, the energy per instruction metric may indicate the amount of energy being consumed for each retired instruction, and the core stall ratio may indicate stall cycles as a fraction of total cycles for the one of the P-cores.

The thread group control module 270 may determine, based at least in part on the monitored metrics, a memory bandwidth constraint with respect to the group of threads executing on the one or more cores (406). For example, a stall ratio controller 308A of the thread group control module 270 may determine that the core stall ratio is exceeding a pre-determined limit, or threshold. In addition, the stall ratio controller 308A may determine that the core power metric and/or the energy per instruction metric, exceeds a predetermined power threshold, e.g. to ensure that the P-core is expending a particular amount of power.

In response to determining the memory bandwidth constraint, the computing device 100 may increase a memory performance corresponding to the group of threads executing on the one or more cores (408). For example, the stall ratio controller 308A may output a control effort signal to the memory performance map 310. The memory performance map 310 may map the control effort signal to a particular DVFS constraint for the memory 114 and/or the fabric 104. The memory performance map 310 may provide the DVFS constraint to the power manager 240, which may increase the frequency and/or voltage level of the memory 114 and/or the fabric 104 accordingly.

Figure 5:
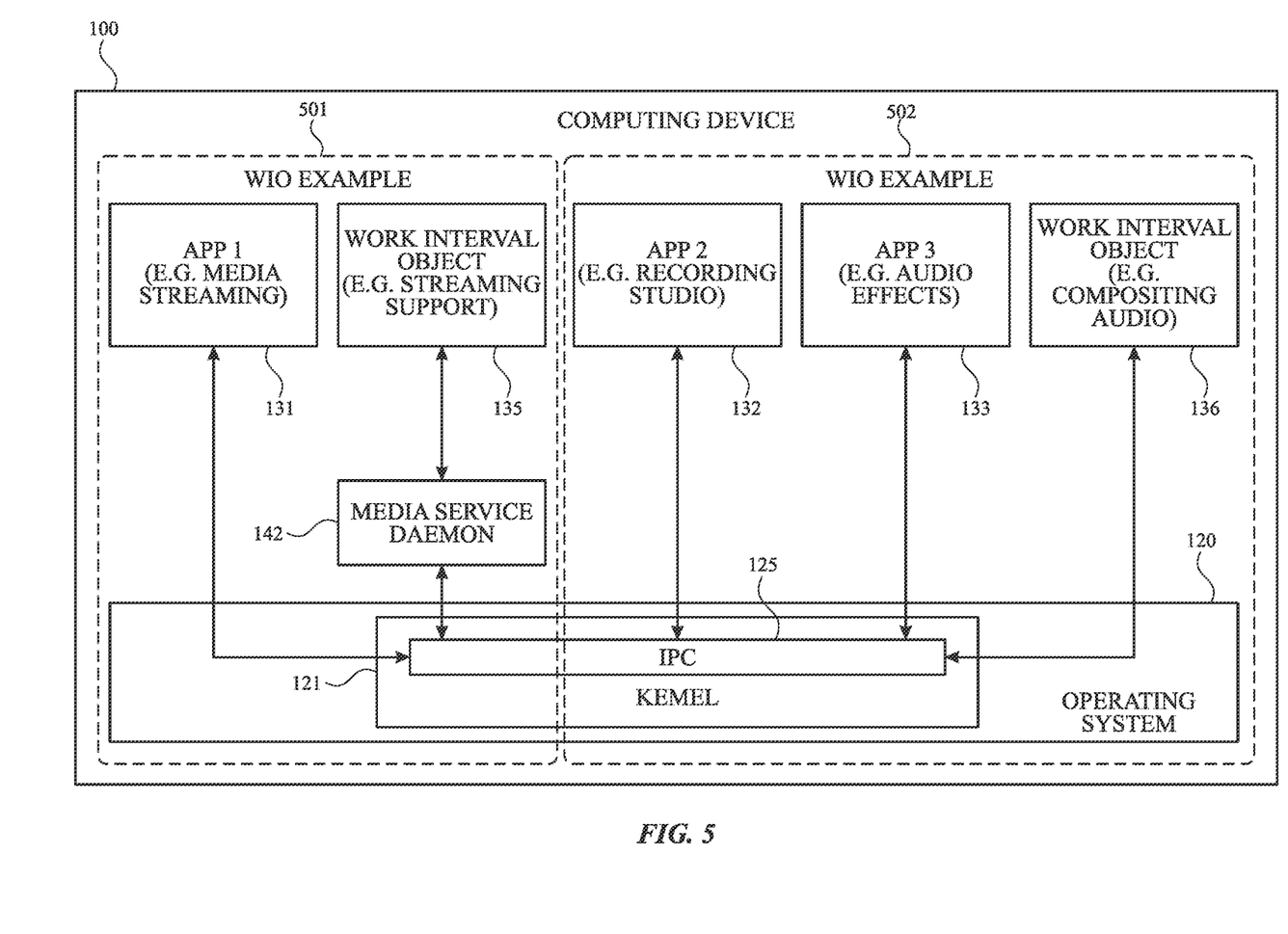
FIG. 5 illustrates two example work interval objects in accordance with one or more implementations.

FIG. 5 illustrates two example work interval objects 501, 502 in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

When an application is launched, threads of the application are initially grouped into thread groups. In one or more implementations, threads may be initially grouped in accordance with grouping specified within program code by whether one the threads perform functionality, such as animation or audio/video functionality, in which the thread structure is known, or whether the threads are launched by a daemon that assigns a thread to a thread group when the daemon launches the thread. Threads may also be initially grouped with other threads launched by a same application. During execution of a thread, the thread may opt-in to join a different thread group. At a later time, the thread may opt-out of the different thread group and return to its initial thread group.

One example of a thread opting-in to a different thread group may occur when a thread performs work having a common purpose with a work interval object (WIO). Threads having a common purpose describe threads that perform similar operations on similar data or resources, where those operations are designed to be performed within the same time interval. In one or more implementations, a WIO may have its own thread group. The thread group may either be created specifically for the WIO or the WIO may be associated with an existing thread group. A thread performing work toward the common purpose of the WIO, intended to be performed within the specified time interval, may opt-in to the WIO thread group.

Thread execution metrics attributable to work performed by the thread on behalf of the WIO may be accumulated with the thread group of the WIO. A work interval object may be used to represent periodic work where each period has a deadline. The WIO may possess a token and a specified interval of time for one instance of the work. For example, an audio compositing application may include an audio compositing WIO 136 for compositing audio from one or more other applications into a single audio frame that must be completed within a predetermined period of time.

Work interval objects may be created in one or more different ways. There may be a set of predefined work interval objects in an operating system, daemon, framework, or application. A kernel of an operating system may create a work interval object explicitly, such as on behalf of a driver. A kernel of an operating system may implicitly create a work interval object on behalf of an application, such as in response to an application call to a framework. Two examples of creating a work interval object are described below.

The WIO example 501 includes a work interval object 135 that is created by a media service daemon 142. The App. 1 131 may be, e.g., a media streaming application. The media service daemon 142 may create the work interval object 135, and threads associated with the WIO 135 may perform streaming support for applications, such as the App. 1 131. The WIO 135 may be, e.g., a WIO to support streaming of audio, video, or both. To ensure continuity of media playback, threads associated with a WIO 135 may process media in accordance with a predetermined time for the WIO 135. The App. 1 131, e.g. may generate a thread, e.g. T1, that performs work that is needed by WIO 135. T1 may have an initial thread group, e.g. TG1, that is associated with the App. 1 131. WIO 135 can have its own thread group, e.g. TG10, associated with WIO 135. WIO 135 may call thread T1 to perform work on behalf of WIO 135. A thread, e.g. T1, can request, via the media service daemon 142 and inter-process communication (IPC) module 125, that thread T1 join WIO 135's thread group (TG10). Thread T1 may opt-in to joining the thread group TG10. When thread T1 to performs work on behalf of the WIO 135, the thread execution metrics for thread T1 are attributed to the thread group TG10.

In the WIO example 502, an application, e.g. the App. 2 132 may call an application programming interface (API) or framework that creates a work interval object 136. Threads associated with the work interval object 136 may perform the functionality requested in the API or framework call by the App. 2 132. The App. 2 132 can be, e.g., a recording studio application. The record studio application may record multiple tracks of audio and/or video, and may further need one or more audio effects applied to a recording. The App. 3 133 may be, e.g., an audio effects program. The App. 2 132 recording studio may like to utilize audio effects of the App. 3 133 on a recording. Threads associated with the work interval object 136 can perform audio compositing on recorded audio by the App. 2 132 using audio effects of the App. 3 133.

The App. 2 132 may generate a thread, e.g. T2, having thread group TG2 associated with App. 2 132, that records audio. The App. 3 133 may generate a thread, e.g. T3, having thread group TG3 associated with the App. 3 133, that applies audio effects to a recording. The WIO 136 may have its own thread group, e.g. TG11. Threads T2 and T3 may generate audio and effects data for compositing audio associated with the WIO 136. One, or both, of T2 or T3 may opt-in to the thread group TG11. If both threads T2 and T3 opt-in to the WIO 136 thread group TG11, then thread execution metrics associated with T2, T3, and WIO 136 may all be attributed to the thread group TG11.

Either, or both, of T2 or T3 may later opt-out of the thread group TG11 and return to their respective initial thread groups. For example, thread T2 may opt-out of the thread group TG11 in response to the App. 2 132 saving or closing an audio file. Thread T3, for example, may opt-out of the thread group TG11 when the App. 3 133 is closed, perhaps due to effects processing no longer being needed by a user.

Figure 6:
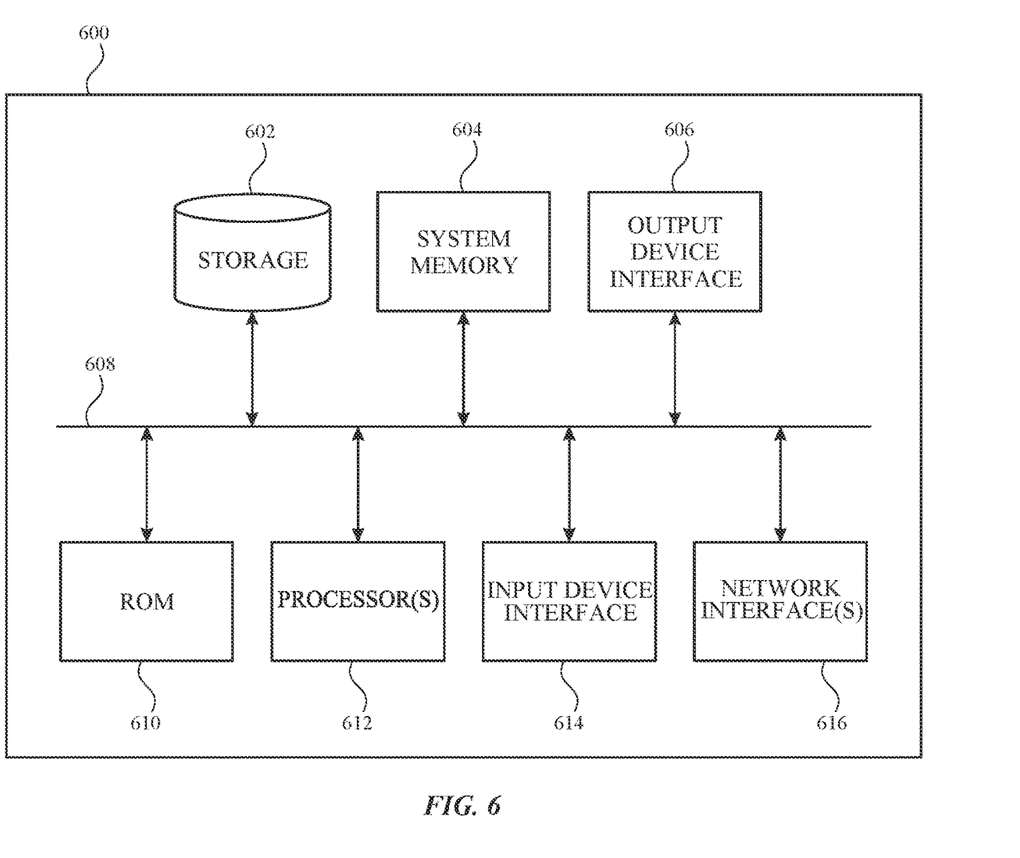
FIG. 6 conceptually illustrates an example electronic system with which aspects of the subject technology may be implemented in accordance with one or more implementations.

FIG. 6 conceptually illustrates an electronic system 600 with which one or more implementations of the subject technology may be implemented. The electronic system 600 can be, and/or can be a part of, one or more of the computing device 100 shown in FIG. 1. The electronic system 600 may include various types of computer readable media and interfaces for various other types of computer readable media. The electronic system 600 includes a bus 608, one or more processing unit(s) 612, a system memory 604 (and/or buffer), a ROM 610, a permanent storage device 602, an input device interface 614, an output device interface 606, and one or more network interfaces 616, or subsets and variations thereof.

The bus 608 collectively represents all system, peripheral, and chipset buses that communicatively connect the numerous internal devices of the electronic system 600. In one or more implementations, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multi-core processor in different implementations.

The ROM 610 stores static data and instructions that are needed by the one or more processing unit(s) 612 and other modules of the electronic system 600. The permanent storage device 602, on the other hand, may be a read-and-write memory device. The permanent storage device 602 may be a non-volatile memory unit that stores instructions and data even when the electronic system 600 is off. In one or more implementations, a mass-storage device (such as a magnetic or optical disk and its corresponding disk drive) may be used as the permanent storage device 602.

In one or more implementations, a removable storage device (such as a floppy disk, flash drive, and its corresponding disk drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processing unit(s) 612 may need at runtime. In one or more implementations, the processes of the subject disclosure are stored in the system memory 604, the permanent storage device 602, and/or the ROM 610. From these various memory units, the one or more processing unit(s) 612 retrieves instructions to execute and data to process in order to execute the processes of one or more implementations.

The bus 608 also connects to the input and output device interfaces 614 and 606. The input device interface 614 enables a user to communicate information and select commands to the electronic system 600. Input devices that may be used with the input device interface 614 may include, for example, alphanumeric keyboards and pointing devices (also called "cursor control devices"). The output device interface 606 may enable, for example, the display of images generated by electronic system 600. Output devices that may be used with the output device interface 606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, the bus 608 also couples the electronic system 600 to one or more networks and/or to one or more network nodes, through the one or more network interface(s) 616. In this manner, the electronic system 600 can be a part of a network of computers (such as a LAN, a wide area network ("WAN"), or an Intranet, or a network of networks, such as the Internet. Any or all components of the electronic system 600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one" of preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   executing a group of threads on one or more cores comprising at least one performance core and at least one efficiency core, the at least one performance core having a higher peak performance than the at least one efficiency core;
   monitoring a plurality of metrics corresponding to the group of threads executing on one or more cores, the plurality of metrics comprising a fill ratio indicating a portion of total cache fills that are attributable to the at least one efficiency core;
   determining, based at least in part on the plurality of metrics, a memory bandwidth constraint with respect to the group of threads executing on the one or more cores; and
   in response to the determining the memory bandwidth constraint, increasing a memory performance corresponding to the group of threads executing on the one or more cores.

2. The method of claim 1, wherein the plurality of metrics comprises a core stall ratio indicating a ratio of stall cycles with respect to total cycles for the one or more cores and a core power metric.

3. The method of claim 2, wherein the core power metric comprises at least one of an energy per instruction metric with respect to the one or more cores or a total power draw metric with respect to the one or more cores.

4. The method of claim 2, wherein determining, based at least in part on the plurality of metrics, the memory bandwidth constraint comprises:
   determining that the core stall ratio exceeds a particular target value; and
   determining that the core power metric exceeds a particular threshold.

5. The method of claim 1, further comprising increasing a performance of the at least one efficiency core when the coherent fill ratio satisfies a threshold.

6. The method of claim 1, wherein monitoring the plurality of metrics corresponding to the group of threads comprises obtaining counter values from core-level hardware counters.

7. The method of claim 1, wherein increasing the memory performance comprises at least one of increasing a frequency or voltage of a dynamic random access memory, or increasing a frequency or voltage of a fabric interconnect for the one or more cores.

8. The method of claim 7, wherein the fabric interconnect communicatively couples the one or more cores.

9. The method of claim 1, further comprising:
   moving the group of threads executing on the one or more cores to execute on another one or more cores; and
   continuing to monitor the plurality of metrics corresponding to the group of threads executing on the other one or more cores.

10. A device comprising:
    a memory; and
    at least one processor configured to:
    monitor a plurality of metrics with respect to a group of threads executing on one or more cores, the one or more cores comprising at least one performance core and at least one efficiency core, the at least one performance core having a higher peak performance than the at least one efficiency core, and the plurality of metrics comprising a fill ratio indicating a portion of total cache fills that are attributable to the at least one efficiency core;

determine, based at least in part on at least one of the plurality of metrics, a memory constraint with respect to the group of threads executing on the one or more cores; and in response to determining the memory constraint, increase a memory performance corresponding to the group of threads executing on the one or more cores.

11. The device of claim 10, wherein the plurality of metrics further comprise a core power metric that comprises at least one of an energy per instruction metric with respect to the one or more cores or a total power draw metric with respect to the one or more cores, and a core stall ratio that indicates a ratio of core stall cycles with respect to total core cycles for the one or more cores.

12. The device of claim 11, wherein the at least one processor is configured to determine the memory constraint by:

determining that the core stall ratio exceeds a target value; and determining that the core power metric exceeds a particular threshold.

13. The device of claim 11, wherein the core stall ratio and core power metric correspond to the at least one performance core.

14. The device of claim 10, wherein increasing the memory performance comprises at least one of increasing a frequency or voltage of a dynamic random access memory, or increasing a frequency or voltage of a fabric interconnect for the one or more cores.

15. The device of claim 14, wherein the fabric interconnect communicatively couples the one or more cores.

16. A system comprising:

a plurality of cores comprising at least one performance core and at least one efficiency core, the at least one performance core having a higher peak performance than the at least one efficiency core;

a fabric interconnect that communicatively couples the plurality of cores;

a dynamic random access memory; and at least one processor configured to:

execute a group of threads on the plurality of cores;

monitor a plurality of metrics with respect to the group of threads executing on the plurality of cores, the plurality of metrics comprising a fill ratio indicating a portion of total cache fills that are attributable to the at least one efficiency core;

determine, based at least in part on at least one of the plurality of metrics, a memory bandwidth constraint with respect to the group of threads executing on the one or more cores; and in response to determining the memory bandwidth constraint, increase a performance of at least one of the dynamic random access memory or the fabric interconnect.

17. The system of claim 16, wherein the at least one processor is configured to increase the performance of the at least one of the dynamic random access memory or the fabric interconnect by increasing a frequency or a voltage level of at least one of the dynamic random access memory or the fabric interconnect.

18. The system of claim 16, wherein the plurality of metrics further comprise a core stall ratio and a core power metric corresponding to the group of threads executing on the at least one performance core.

19. The system of claim 16, wherein the at least one processor is configured to increase the performance of the at least one of the dynamic random access memory or the fabric interconnect by increasing a frequency or voltage of the dynamic random access memory, or increasing a frequency or voltage of the fabric interconnect for the one or more cores.

20. The system of claim 16, wherein the threads of the thread group are grouped together based at least in part on a common purpose.

* * * * *

UNITED STATES PATENT AND TRADEMARK OFFICE
CERTIFICATE OF CORRECTION

PATENT NO. : 11,709,748 B2
APPLICATION NO. : 17/098262
DATED : July 25, 2023
INVENTOR(S) : John G. Dorsey et al.

It is certified that error appears in the above-identified patent and that said Letters Patent is hereby corrected as shown below:

In the Claims

Column 16, Line 43 (Claim 5):
"coherent fill ratio"
Should read:
--fill ratio--

Signed and Sealed this
Twelfth Day of December, 2023

Katherine Kelly Vidal
*Director of the United States Patent and Trademark Office*